Figure 1:
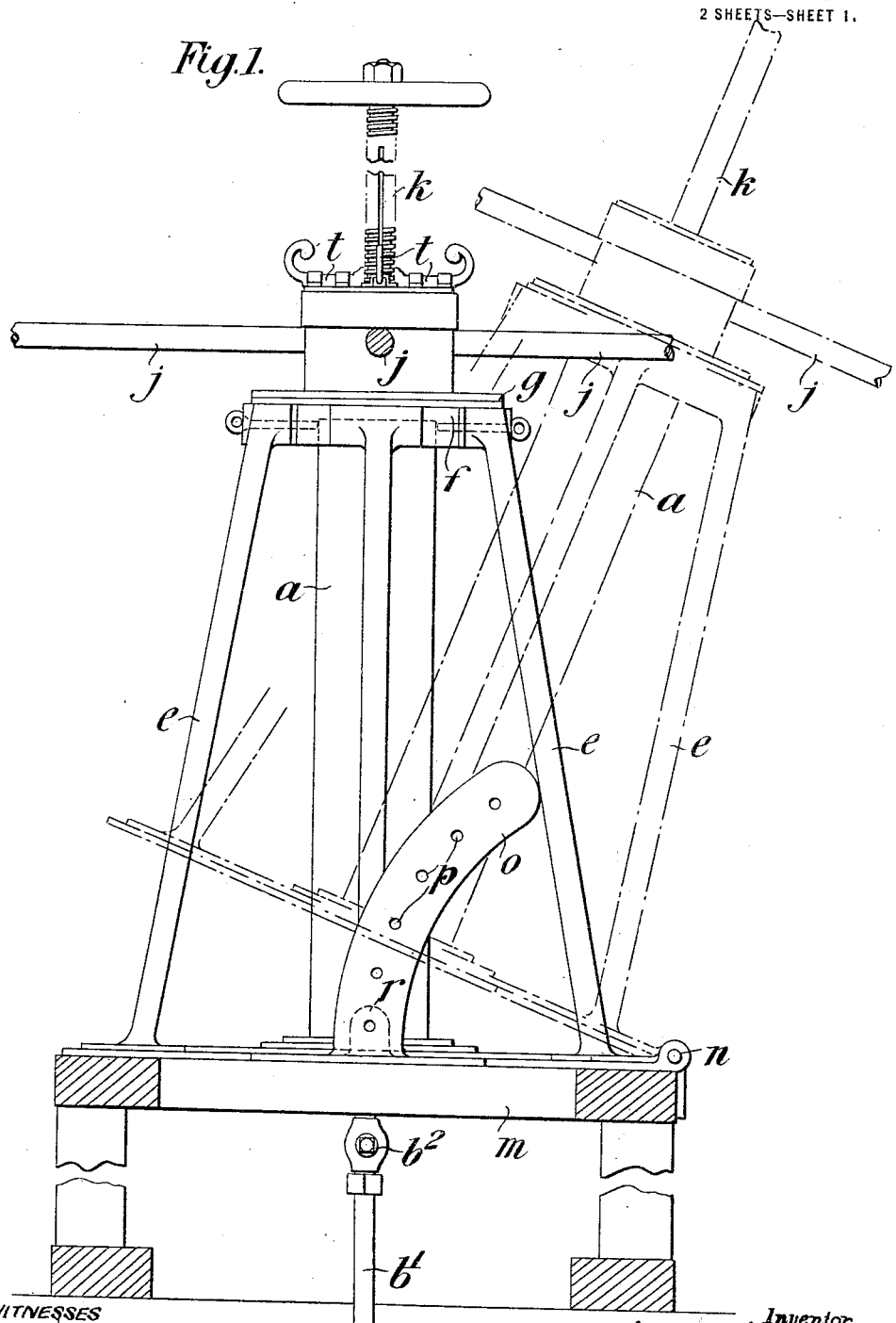

C. FERRAR.
APPARATUS FOR STRENGTHENING SUBSTRATA.
APPLICATION FILED JULY 2, 1914.

1,198,715.

Patented Sept. 19, 1916.
2 SHEETS—SHEET 1.

WITNESSES
Inventor
Charles Ferrar
By Whitaker Prevost
attys

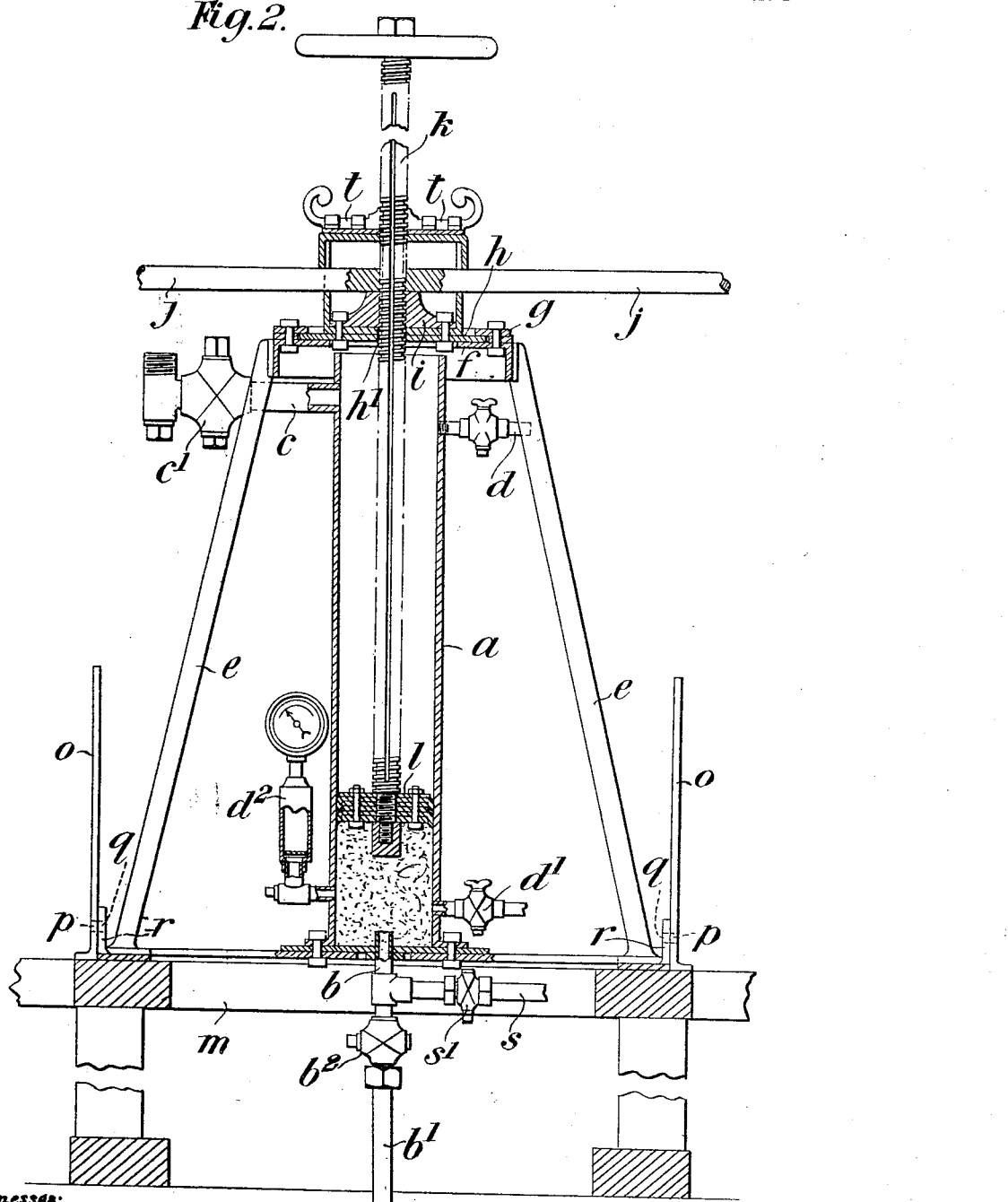

UNITED STATES PATENT OFFICE.

CHARLES FERRAR, OF SELHURST, LONDON, ENGLAND.

APPARATUS FOR STRENGTHENING SUBSTRATA.

1,198,715.  Specification of Letters Patent.  Patented Sept. 19, 1916.

Application filed July 2, 1914. Serial No. 848,687.

*To all whom it may concern:*

Be it known that I, CHARLES FERRAR, a subject of the King of Great Britain, residing at 36 Dagnall Park, Selhurst, London, England, have invented a new and useful Improved Apparatus for Strengthening Substrata, of which the following is a specification.

My invention relates to improvements in apparatus for use in the strengthening or reinforcing of substrata by means of cement which is forced into the faulty substratum in the form of liquid grout and under a suitable pressure through a pipe which is sunk therein to the required depth.

According to my invention I make use of apparatus which comprises a cylinder having at its lower end a depending pipe which is sunk into the substratum to the requisite depth and which cylinder is closed at its upper end and is provided with an inlet pipe for receiving the liquid cement grout, and with a central orifice through which there passes a screw spindle carrying at its inner end a piston or the like and engaging a nut rotatably mounted upon the cylinder end, any suitable means being provided for rotating the nut, such as a series of radial arms designed to be turned manually.

The cylinder is supported upon a stand or the equivalent which is preferably hinged upon a portable stage and which stage has upwardly projecting lateral guides, by which means the inclination of the cylinder to the ground can be varied as desired, the lateral guides serving to secure the support in any position to which it may be tilted.

The apparatus operates as follows, that is to say, assuming that it is placed in position and its inclination to the vertical adjusted in the direction required for the insertion of the filling tube and assuming also that the piston is at the upper end of the cylinder, a charge of liquid cement grouting is filled into the latter below the piston which is then forced downward by turning the nut through the medium of the radial arms. The pressure exerted by the piston upon the upper surface of the liquid grouting forces the latter down through the tube into the substratum which it permeates so as to fill the interstices and fissures which have been formed therein. The cement grouting subsequently hardens, thereby solidifying and strengthening the substratum, the pressure being maintained until this takes place, say by means of a valve applied to the pipe.

In some cases, the machine may be constructed so that it can be adapted to bore the holes necessary to reach the desired point in the substratum. For this purpose, provision is made whereby the cylinder can be detached and the boring tool (and pipe) applied to the lower end of the spindle, so that it moves with the latter. Means, such as a pawl or the like, are also provided whereby the screw spindle can be locked to the nut or released therefrom so that the spindle and thereby the boring tool can be caused to rotate or to move axially.

To enable my invention to be fully understood, I will describe it by reference to the accompanying drawing, in which:—

Figure 1 is an elevation of apparatus for strengthening substrata according to my invention, and Fig. 2 is a sectional elevation at right angles to Fig. 1.

$a$ represents the cylinder the lower end of which is fitted with the pipe $b$ which is designed to be connected to a pipe sunk into the substratum to the depth required for instance, by a flexible hose $b^1$, a cock $b^2$ being arranged between the said pipe and hose.

$c$ is the inlet pipe at the upper part of the cylinder for supplying the latter with liquid cement grout and $d$ is a waste pipe attached to the cylinder $a$ a small distance below the inlet pipe $c$, the object of which is to enable the surplus liquid grout to be drawn off.

$d^1$ is an air inlet cock and $d^2$ a pressure gage at the lower end of the cylinder $a$.

$e$ is the stand or the like upon which the cylinder $a$ is supported, the stand being shown in the form of a tripod structure to the lower part of which the base of the cylinder $a$ is secured and the upper part of which has a plate $f$ which forms a top or end to the upper part of the cylinder, which, however, is not actually in contact with it. This plate or cylinder end $f$ is formed with a circular guide $g$ within which there can rotate the plate $h$ to which is bolted the nut $i$ designed to be rotated by the radial arms $j$ which engage with it. $k$ is the screw spindle which passes through the said nut $i$ and also through a central orifice $h^1$ provided in the plates $h$ and $f$.

$l$ is the piston which is secured to the lower end of the screw $k$.

$m$ is the portable stage upon which the support $e$ is hinged at $n$, and $o, o$, are two upwardly projecting lateral plates which are formed with a series of holes $p$. With this construction, as will be obvious, the support $e$ can be tilted upon the stage $m$ as shown in broken lines in Fig. 1, and can be secured in the position to which it is inclined by means of pins or bolts passed through the holes $p$ and through corresponding holes $q$ in lugs $r$ upon the lower part of the support $e$.

The pipe $b$ depending from the lower end of the cylinder has opening into it a pipe $s$ provided with a cock $s^1$ and designed to be placed in connection by means of a flexible hose with a source of compressed air. The liquid cement grout inlet pipe $c$ is also provided with a cut off cock $c^1$ and is likewise designed to be placed in communication by means of a flexible pipe, with a supply of compressed air for forcing the grout into the cylinder $a$ if required and this supply may also be used for charging the cylinder $a$ with water as hereinafter described.

$t, t$ are pawls or bolts which are slidably mounted upon the upper end of the nut $i$ and are so arranged that they can be slid into engagement with the screw $k$ so as to lock the said screw to the nut, or out of engagement therewith. By this means the screw can either be caused to rotate with the nut, or be moved axially on the rotation of the latter.

As will be understood from the foregoing description, the apparatus is employed as follows:—After a hole has been bored into the ground so as to reach the substratum which it is desired to strengthen and which boring may be effected by the apparatus as above described, the latter is placed in position such that the flexible pipe $b$ depending from the cylinder $a$ can be connected to the usual pipe which has been inserted in the bored hole, the cock $b^2$ being closed and the cock $d^1$ opened. When the piston $l$ is raised to the upper end of the cylinder $a$ so as to put the inlet pipe $c$ into communication with the cylinder below the piston the cock $d^1$ is closed and liquid cement grout is introduced through the said inlet so as to fill the cylinder up to the waste outlet $d$. The supply of grout is then discontinued the cock $c^1$ being closed and the cylinder $a$ put into communication for a short period with a supply of compressed air by opening the cock $s^1$, this compressed air aerating and stirring up the liquid grout within the cylinder so as to prevent its untimely setting. The cocks $c^1$ and $s^1$ are then closed and the cock $b^2$ opened and the radial arms $j$ are turned by hand so as to rotate the nut $i$ and thus cause the screw $k$ to move axially relatively thereto, and so gradually force the piston $l$ down the cylinder $a$ and thereby press the liquid cement grout down into the hole bored so that it reaches the substratum which it is desired to strengthen and penetrates into and permeates the fissures and interstices which have been formed or are found therein. When the piston has reached the lower end of its stroke the cock $b^2$ is closed so as to maintain the pressure upon the liquid grout which has been forced into the substratum until the latter has permanently set.

Instead of a single hole a series thereof may be bored, the cylinder $a$ being arranged in such a position that the flexible hose $b^1$ can be connected to the pipe in each hole in turn for charging it with the grout.

As, in some cases the strata are charged with mud and loam, I find it advantageous to employ my apparatus for clearing away the same before the grout is introduced, and to this end I connect the pipe $c$ to the water service or to a water supply under pressure from the source of compressed air hereinbefore referred to, so that the cylinder can be charged and the charge of water forced therefrom into the strata by the piston $l$. A quick succession of charges having been made they are maintained under pressure until the grout is put in.

Claims:

1. An apparatus for use in strengthening substrata, comprising a cylinder, a grouting pipe depending from the lower end of said cylinder, a manually operated valve provided in said pipe, a piston provided in said cylinder, means for reciprocating said piston, an inlet pipe at the upper part of the cylinder for receiving liquid cement grouting, and an air inlet pipe provided near the lower end of said cylinder.

2. An apparatus for use in strengthening substrata, comprising a cylinder, a grouting pipe depending from the lower end of said cylinder, a manually operated valve provided in said pipe, a piston provided in said cylinder, means for reciprocating said piston, an inlet pipe at the upper part of the cylinder for receiving liquid cement grouting, an air inlet pipe provided near the lower end of said cylinder, and a compressed air inlet pipe communicating with said grouting pipe.

3. An apparatus for use in strengthening substrata, comprising a cylinder, a grouting pipe depending from the lower end of said cylinder, a manually operated valve provided in said pipe, a piston provided in said cylinder, means for reciprocating said piston, an inlet pipe at the upper part of the cylinder for receiving liquid cement grouting, an air inlet pipe provided near the lower end of said cylinder, a compressed air inlet pipe communicating with said grouting pipe, and a pressure gage also located near the lower end of said cylinder and communicating with the interior of the same.

4. An apparatus for use in strengthening substrata comprising a cylinder, a grouting pipe depending from the lower end of said cylinder provided with a manually operated valve adapted to be closed while the cylinder is being filled with the grouting, an inlet pipe for the grouting located near the upper end of the cylinder, an air inlet provided on said cylinder near its lower end, a compressed air inlet pipe communicating with said grouting pipe for conveying compressed air to the interior of the cylinder when said cylinder has been filled with the grouting, a pressure gage also located near the lower end of said cylinder for indicating the amount of air admitted to said cylinder through the compressed air pipe, a piston located in said cylinder for forcing the grouting through the grouting pipe when the valve of the grouting pipe is open, and means for depressing said piston.

5. An apparatus for use in strengthening substrata comprising a portable support adapted to be placed above the point where the cement is to be introduced, a bracket having its lower end hinged to said support, means for supporting said bracket at an inclination to said support when said bracket has been swung on its hinge, a cylinder fixed to said bracket and provided at its lower end with a grouting pipe, means for introducing grouting into said cylinder, and means for forcing said grouting from said cylinder.

CHARLES FERRAR.

Witnesses:
JOHN E. ROUSFIELD,
C. G. REDFERN.

Copies of this patent may be obtained for five cents each, by addressing the "Commissioner of Patents, Washington, D. C."